United States Patent
Ma et al.

(10) Patent No.: US 6,900,120 B2
(45) Date of Patent: May 31, 2005

(54) LIQUID CRYSTAL DISPLAY DEVICE AND METHOD FOR MANUFACTURING THE SAME

(75) Inventors: Won-Seok Ma, Seongnam-si (KR); Eung-Sang Lee, Seoul (KR); Young-Bae Jung, Gyungsangbook-do (KR); Won-Kyu Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/888,481

(22) Filed: Jul. 9, 2004

(65) Prior Publication Data

US 2004/0248333 A1 Dec. 9, 2004

Related U.S. Application Data

(62) Division of application No. 10/218,390, filed on Aug. 14, 2002, now Pat. No. 6,774,969.

(30) Foreign Application Priority Data

Oct. 22, 2001 (KR) .................................. 2001-0064997
Jan. 26, 2002 (KR) .................................. 2002-0004612

(51) Int. Cl.$^7$ .......................... H01L 21/00; G02F 1/343
(52) U.S. Cl. ...................... 438/627; 438/643; 438/609; 438/678; 438/30; 438/608; 349/139; 349/152; 349/143; 349/43; 349/42; 257/72; 257/59
(58) Field of Search ................................ 349/139, 152, 349/143, 43, 42; 438/627, 643, 609, 608, 678, 30; 257/72, 59

(56) References Cited

U.S. PATENT DOCUMENTS

| | | | | |
|---|---|---|---|---|
| 5,851,918 A | * | 12/1998 | Song et al. | 438/627 |
| 5,978,058 A | * | 11/1999 | Sung | 349/139 |
| 6,033,973 A | * | 3/2000 | Takemura | 438/514 |
| 6,544,711 B1 | * | 4/2003 | Anderson et al. | 430/138 |
| 6,649,318 B1 | * | 11/2003 | Gao et al. | 430/138 |
| 2002/0022156 A1 | * | 2/2002 | Bright | 428/698 |
| 2002/0078559 A1 | * | 6/2002 | Buchwalter et al. | 29/832 |
| 2002/0105263 A1 | * | 8/2002 | Kim | 313/498 |
| 2003/0048519 A1 | * | 3/2003 | Kozicki | 359/252 |

* cited by examiner

*Primary Examiner*—Matthew Smith
*Assistant Examiner*—Victor V Yevsikov
(74) *Attorney, Agent, or Firm*—Cantor Colburn LLP

(57) ABSTRACT

Disclosed are a liquid crystal display device and a method for manufacturing the same, in which wirings connected between pads and an integrated circuit is protected from being corroded. A pixel array is formed on a display region of a substrate. A plurality of pads are formed on a non-display region of the substrate. An integrated circuit is formed on the non-display region of the substrate and connected to the pads to generate a signal for operating the pixel array. Conductive barrier layers separated from each of the pads are formed on peripheral portions of the pads connected to the integrated circuit. The conductive barrier layers have electric potential equivalent to that of each of the pads in accordance with internal connections of the integrated circuit. When bumps of the integrated circuit and the pads are attached to each other, the conductive barrier layers prevent the pads and the wirings connected to the pads from being corroded.

12 Claims, 15 Drawing Sheets

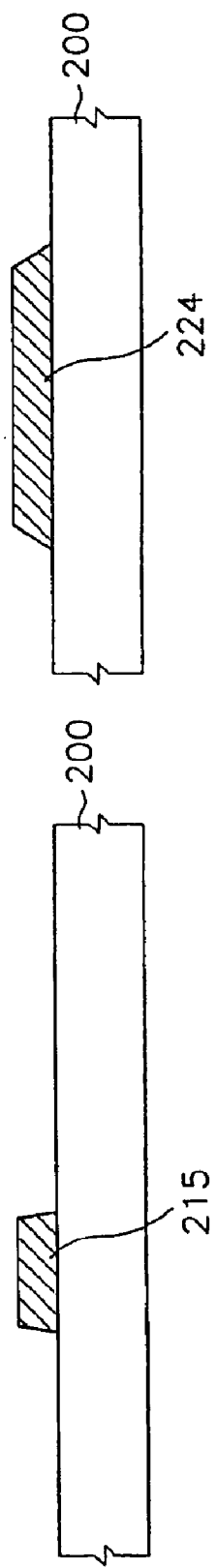

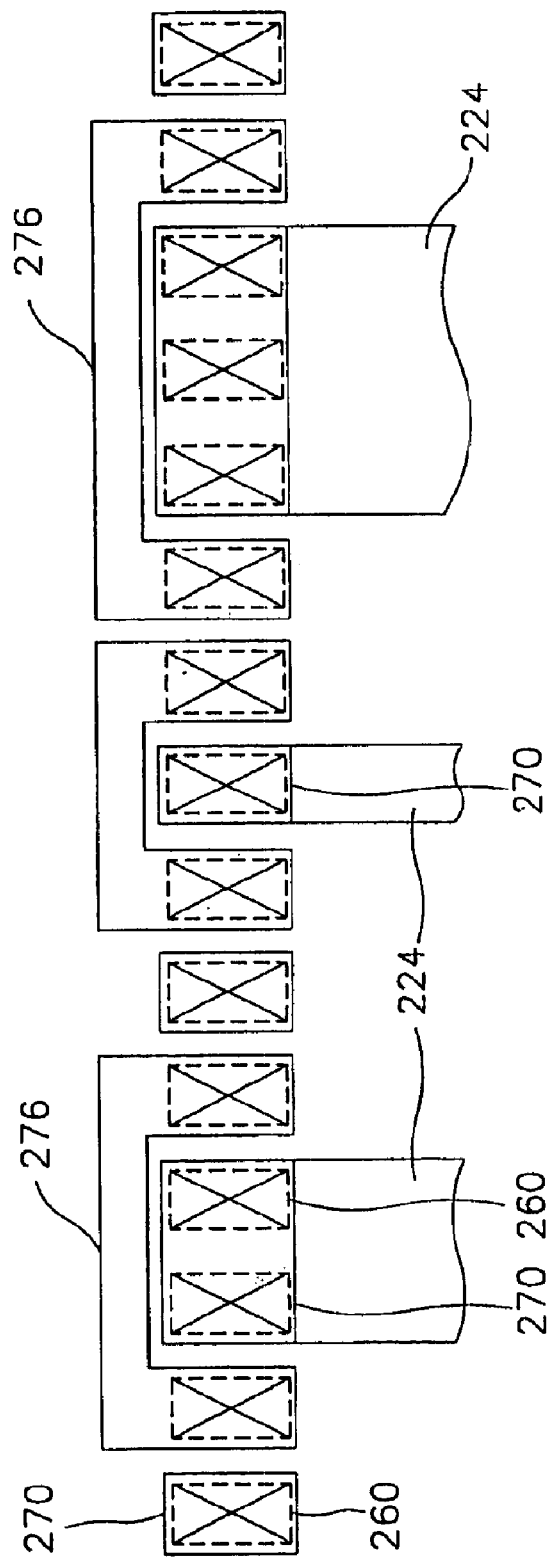

LIQUID CRYSTAL DISPLAY DEVICE AND METHOD FOR MANUFACTURING THE SAME

CROSS REFERENCE TO RELATED APPLICATIONS

This application is a divisional application of U.S. patent application Ser. No. 10/218,390, filed on Aug. 14, 2002, now U.S. Pat. No. 6,774,969 the disclosure of which is herein incorporated by reference in its entirety.

BACKGROUND OF THE INVENTION

1. Field of the Invention

The present invention relates to a liquid crystal display device and a method for manufacturing the same, and more particularly to a liquid crystal display device in which pads of a liquid crystal display panel and/or wirings connected to the pads are protected from being corroded when the pads are connected to an external driver integrated circuit, and a method for manufacturing the liquid crystal display device.

2. Description of Related Art

In these days, electronic display devices are more widely used as information transmission media and various types of electronic display devices are used for industrial apparatus or home appliances. Such electronic display devices have been developed to have appropriate functions for various demands of the information era.

In general, electronic display devices display various information so that users can utilize such information. That is, the electronic display devices convert electric information signals outputted from electronic apparatus into light information signals recognized by the users through their eyes.

The types of electronic display devices include an emissive display device type and a non-emissive display device type. An emissive display device displays light information signals by using light emission, and a non-emissive display device displays light information signals by using reflection, scattering or interference of light. The emissive display device includes a cathode ray tube (CRT), a plasma display panel (PDP), a light emitting diode (LED) and an electroluminescent display (ELD). The emissive display device is called an active display device. Also, the non-emissive display device, called a passive display device, includes a liquid crystal display (LCD), an electrochemical display (ECD) and an electrophoretic image display (EPID).

The CRT has been used for a television or a monitor of a computer as a display device for a long time since it has a high quality and a low manufacturing cost. The CRT, however, has some disadvantages such as a heavy weight, a large volume and high power consumption.

Recently, the demand for a new electronic display device is greatly increased such as a flat panel display device having excellent characteristics of thin thickness, light weight, low driving voltage and low power consumption. Such flat panel display devices can be manufactured owing to the rapidly improved semiconductor technology.

Of the flat panel devices, the liquid crystal display (LCD) devices have been widely utilized for various electronic devices because an LCD device is thin and has low power consumption and high display quality almost same as that of a CRT. Also, the LCD devices can operate with a low driving voltage and can be easily manufactured so that the LCD devices are widely used for various electronic apparatuses.

The LCD devices are generally divided into a transmission type LCD device, a reflection type LCD device, and a reflection-transmission type LCD device. The transmission type LCD device displays information by using an external light source and the reflection type LCD device displays information by using natural light. The reflection-transmission type LCD device operates in a transmission mode for displaying an image using a built-in light source of the display device in a room or in a dark place where an external light source does not exist, and operates in a reflection mode for displaying the image by reflecting external incident light in the area having high illumination.

FIG. 1 is a schematic perspective view showing an LCD panel of a conventional liquid crystal display device, FIG. 2 is a plan view showing a conventional LCD panel and integrated circuits connected to the LCD panel for driving the LCD panel, and FIG. 3 is a cross-sectional view showing a thin film transistor and a pad region of the conventional LCD panel.

Referring to FIGS. 1 and 2, a liquid crystal device has an LCD panel 130 for displaying an image and driver integrated circuits 137 and 138 for generating image signals.

The LCD panel 130 includes a first substrate 100, a second substrate 102 located opposite to the first substrate 100, and liquid crystal 114 injected between the first substrate 100 and the second substrate 102.

A plurality of gate and data lines 104 and 106 are formed on the first substrate 100 in a matrix shape, and pixel electrodes 108 and thin film transistors (TFT) are formed at intersections of the gate lines 104 and the data lines 106. A color filter 112 and a transparent common electrode 110 are formed on the second substrate 102. The color filter 112 includes red-green-blue (R·G·B) pixels displaying predetermined colors while light passes through the pixels. Also, polarizing plates (not shown) are formed on the outsides of the first and the second substrates 100 and 102 for maintaining a direction of the light transmitting thereof according to an orientation of the liquid crystal 114.

Referring to FIG. 3, a thin film transistor 109 has a gate electrode 15 formed on the first substrate 100, a gate insulation layer 25 formed on the gate electrode 15 and the first substrate 100, an active pattern 30 formed on the gate insulation layer 25 where the gate electrode 15 is positioned, an ohmic contact layer pattern 35 formed on the active pattern 30, and source and drain electrodes 40 and 45 formed on the ohmic contact pattern 35. A passivation layer 50 is formed on the first substrate 100 on which the thin film transistor 109 is formed. The passivation layer 50 is comprised of an inorganic material or an organic material. A contact hole 80 is formed through the passivation layer 50 to expose the drain electrode 45. Also, contact holes (not shown) are formed through the passivation layer 50 to expose gate terminals and drain terminals in a pad region.

The gate electrode 15 is connected to the gate line 104, and the source electrode 40 is connected to the data line 106. The drain electrode 45 is connected to the pixel electrode 108. Thus, when a scanning voltage is applied to the gate electrode 15 through the gate line 104, a signal voltage passing the data line 106 is applied from the source electrode 40 to the drain electrode 45 through the active pattern 30. When the signal voltage is applied to the drain electrode 45, a potential difference is generated between a common electrode 110 of the second substrate 102 and the pixel electrode 108 connected to the drain electrode 45. Then, the molecular arrangement of the liquid crystal 114 injected between the pixel electrode 108 and the common electrode 110 is changed, so light transmissivity of the liquid crystal 114 is varied. Thus, the thin film transistor 109 serves as a switching device for operating pixels of the LCD panel 130.

In addition, first pads 133 and second pads 134 are formed on the LCD panel 130 as shown in FIG. 2. The first pads 133 are prolonged from the gate line 104 and the second pads 134 are prolonged from the data line 106. The first pads 133 are connected to a first integrated circuit 137 generating the scanning voltage, and the second pads 134 are connected to a second integrated circuit 138 generating the signal voltage. Hence, the scanning voltage generated from the first integrated circuit 137 is applied to the gate line 104 through the first pads 133, and the signal voltage generated from the second integrated circuit 138 is applied to the data line 106 through the second pads 134. Various methods can be utilized for connecting the first pads 133 to the first integrated circuit 137 or connecting the second pads 134 to the second integrated circuit 138. Typically, bumps for having connection with the pads are formed on electrodes of the integrated circuit, and then the pads are connected to the integrated circuit using the bumps.

In general, a tape automated bonding (TAB) method is used for connecting the pads to the integrated circuit. According to the TAB method, a lead of a TAB package attached to an electrode of the integrated circuit is attached to the LCD panel after a film having metal lines attached thereto and the electrode are connected to each other using bumps. That is, after mounting the integrated circuit on the outside of the LCD panel, the electrode of the integrated circuit and the electrode of the LCD panel are electrically connected with each other using the film to which metal lines are attached.

Also, a chip on glass (COG) method can be utilized for connecting a driver integrated circuit to an LCD panel instead of the TAB method. According to the COG method where the driver integrated circuit is directly installed on the LCD panel, the integrated circuit is attached to the substrate of the LCD panel only using bumps and an anisotropic conductive film (ACF) without the film used in the TAB method.

FIG. 4 is a cross-sectional view illustrating a conventional COG method for connecting an integrated circuit to a liquid crystal display device.

Referring to FIG. 4, an ACF resin 153 is loaded on a substrate 180 corresponding to pads 181 of an LCD panel. Then, an integrated circuit 140 on which bumps 144 are formed is attached to the substrate 180 via a thermal compression method. As a result, conductive balls 154 dispersed in the ACF resin 153 are pressed by the bumps 144 and the pads 181 so that an insulating layer (not shown) enclosing the conductive balls 154 are broken. Thus, an electrode of the integrated circuit 140 and the pads 181 of the LCD panel are electrically connected. Subsequently, the integrated circuit 140 is heated to harden the ACF resin 153 which has been softened due to the compression process, thereby attaching the integrated circuit 140 to the pads 181 of the substrate 180.

The COG method is widely used for small and midsize panels to enhance durability of a mobile product which is subject to external impact or vibration, because it is simply performed in comparison with the TAB method and the area ratio of an LCD panel increases in a liquid crystal display device.

However, when pollutants such as moisture or chemicals penetrate into exposed portions of the pads connected to the bumps of the integrated circuit, the pads and the wirings connected thereto may be corroded due to an electrochemical reaction between the pollutants and the pads and/or the wirings. Thus, the metal corrosion occurs and the electrical signal of the wirings is interrupted to thereby cause a failure in driving the liquid crystal display device.

Such metal corrosion may also occur due to electrolysis caused by the potential difference between the adjacent pads. That is, when the potential difference is generated between two metals, electrons of a positive (+) metal migrate into a negative (−) metal so that the positive metal is lack of electrons and thus, is corroded finally. Particularly, as the potential difference between the adjacent pads is larger, the pads and/or the wirings connected thereto are corroded easily.

For example, a gate signal applied to a gate driver integrated circuit of the liquid crystal display device may include voltage Von, voltage Voff, a vertical clock signal and a vertical start pulse signal. Voltage Von and voltage Voff are +15V and −7V, respectively, and thus, the potential difference therebetween becomes 22V. Such high potential difference increases the electron migration to thereby cause corrosion in the pad to which voltage Von is applied, which results in the driving failure of the gate driver integrated circuit.

SUMMARY OF THE INVENTION

The present invention solves the aforementioned and other problems. The present invention provides a liquid crystal display device in which pads and/or wirings connected to the pads are protected from being corroded when the pads of an LCD panel are connected to a driver integrated circuit.

In another aspect, the present invention provides a method for manufacturing a liquid crystal display device in which pads and/or wirings connected to the pads are protected from being corroded when the pads of an LCD panel are connected to a driver integrated circuit.

In one exemplary embodiment, the present invention provides a liquid crystal display device comprising a substrate, a pixel array formed on a display region of the substrate, a plurality of pads formed on a non-display region of the substrate, and an integrated circuit formed on the non-display region of the substrate and electrically connected to the pads to generate a signal for operating the pixel array. Conductive barrier layers are formed on peripheral portions of the pads connected to the integrated circuit and separated from the pads. Each of the conductive barrier layers has an electric potential equivalent to that of each of the pads in accordance with internal connections of the integrated circuit.

In another exemplary embodiment, the present invention provides a liquid crystal display device comprising a substrate, a pixel array formed on a display region of the substrate, an integrated circuit formed on a non-display region of the substrate to generate a signal for operating the pixel array, a plurality of output pads each having one end connected to corresponding one of a plurality of first wirings prolonged from the display region to the non-display region and the other end electrically connected to a terminal on a first side of the integrated circuit, and a plurality of input pads each having one end connected to corresponding one of a plurality of second wirings formed on the non-display region of the substrate and the other end electrically connected to a terminal on a second side of the integrated circuit. In the above liquid crystal display device, conductive barrier layers separated from the pads are formed on peripheral portions of the input pads connected to the integrated circuit. The conductive barrier layers have electric potential equivalent to that of each of the input pads in accordance with internal connections of the integrated circuit.

Further, in another exemplary embodiment, the present invention provides a liquid crystal display device comprising a first substrate having a pixel array including a plurality of pixels formed on a central portion of the first substrate in a matrix shape, in which a plurality of first pads are formed on first peripheral portions of the first substrate to apply a first signal to the plurality of pixels and a plurality of second pads are formed on second peripheral portions of the first substrate to apply a second signal to the plurality of pixels, a second substrate having a color filter formed corresponding to the central portion of the first substrate, a liquid crystal layer formed between the first substrate and the second substrate, first integrated circuits connected with the first pads on the first peripheral portions by COG method, and second integrated circuits connected with the second pads on the second peripheral portions by COG method. First barrier layers separated from each of the first pads are formed on peripheral portions of the first pads connected to the first integrated circuits and second barrier layers separated from each of the second pads are formed on peripheral portions of the second pads connected to the second integrated circuits. Each of the first barrier layers has an electrical potential equivalent to that of each of the first pads and each of the second barrier layers has an electrical potential equivalent to that of each of the second pads.

In further exemplary embodiment, the present invention provides a method for manufacturing a liquid crystal display device comprising the steps of forming wirings on a substrate, forming a passivation layer on the wirings and the substrate, partially etching the passivation layer to open contact regions on the wirings, depositing a conductive layer on the resultant structure and patterning the conductive layer to form a plurality of pads each connected to the corresponding one of the wirings through corresponding one of the contact regions, forming conductive barrier layers by etching the passivation layer and patterning the conductive layer to be separated from the pads and formed on peripheral portions of the pads connected to an external integrated circuit, the conductive barrier layers having an electrical potential equivalent to that of each of the pads, and connecting the pads with the external integrated circuit. The conductive barrier layers having equivalent electrical potential may be separated from the pads and formed on the peripheral portions of the pads connected to the integrated circuit. The conductive barrier layers and the pads may be formed in a same layer. The conductive barrier layer may be formed in a closed loop shape. The conductive barrier layer may also be formed in an opened loop shape to prevent leakage current from being generated between a wiring connected to the pad and a conductive barrier layer having an equivalent electrical potential.

A liquid crystal display device of the present invention may also include conductive buffer layers formed on sides of the wirings connected to the pads to be protruded from each of the pads and the conductive barrier layer, thereby preventing the conductive barrier layers from being corroded due to pollutants such as moisture or chemicals. At least one ground line may be formed between the pads connected to the integrated circuit, thereby preventing a pad having electrical potential equivalent to that of the pad connected with the integrated circuit from being corroded.

BRIEF DESCRIPTION OF THE DRAWINGS

The present invention will become readily apparent by reference to the following detailed description when considered in conjunction with the accompanying drawings wherein:

FIGS. 8A to 8D are cross-sectional views for explaining a method for manufacturing a liquid crystal display device according to the first embodiment of the present invention;

FIG. 9 is a schematic view showing a gate input pad part of a gate driver integrated circuit according to a second embodiment of the present invention;

DETAILED DESCRIPTION OF INVENTION

Hereinafter, a liquid crystal display device and a method for manufacturing the liquid crystal display device according to the present invention will be described in detail with reference to the exemplary embodiments and accompanying drawings.

Figure 1:
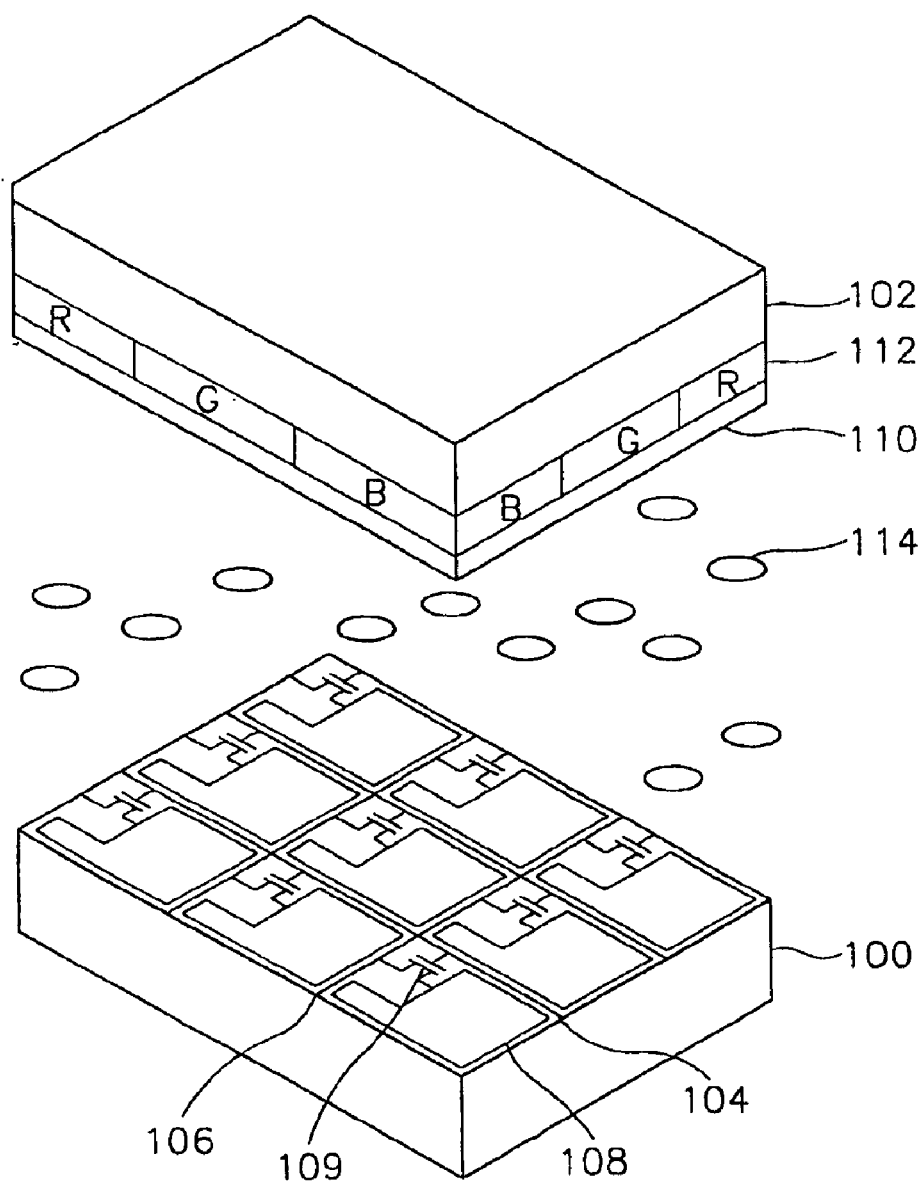
FIG. 1 is a schematic perspective view showing an LCD panel of a conventional liquid crystal display device.
Figure 2:
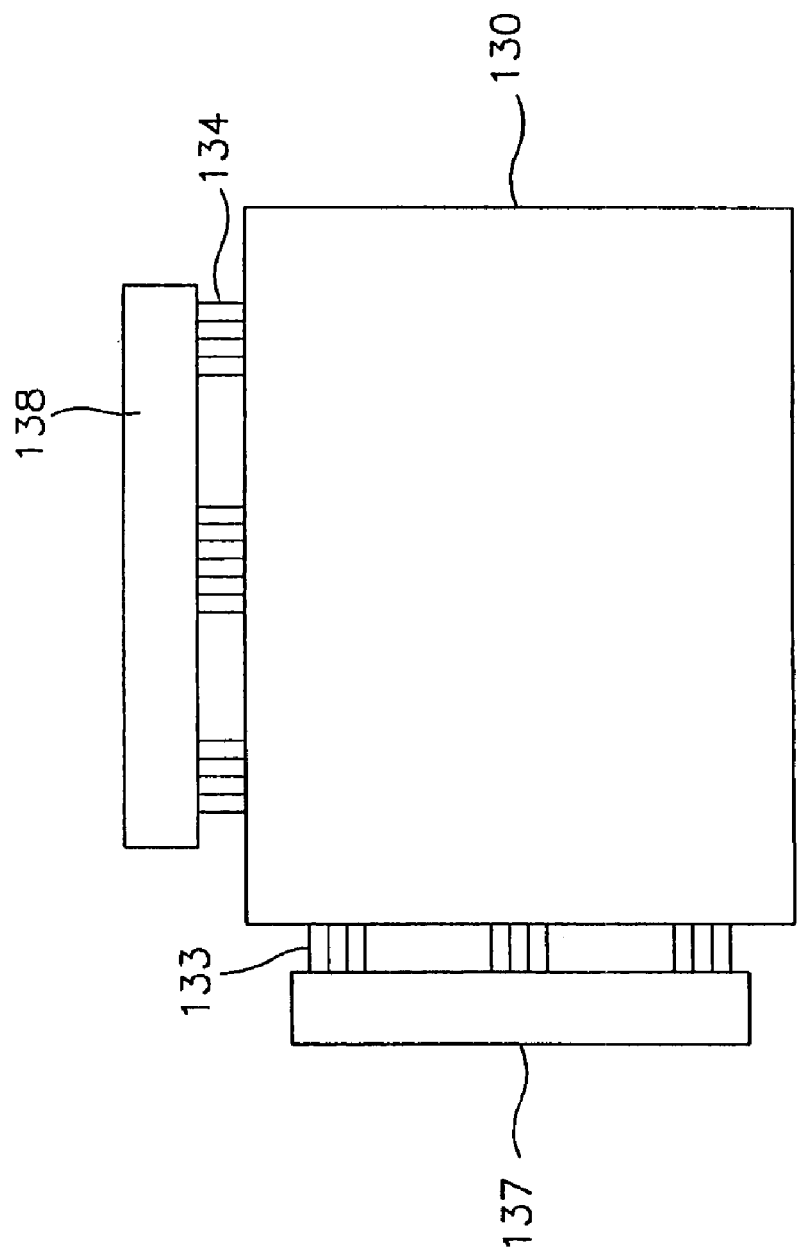
FIG. 2 is a schematic view showing a conventional LCD panel and integrated circuits connected to the LCD panel for driving the LCD panel.
Figure 3:
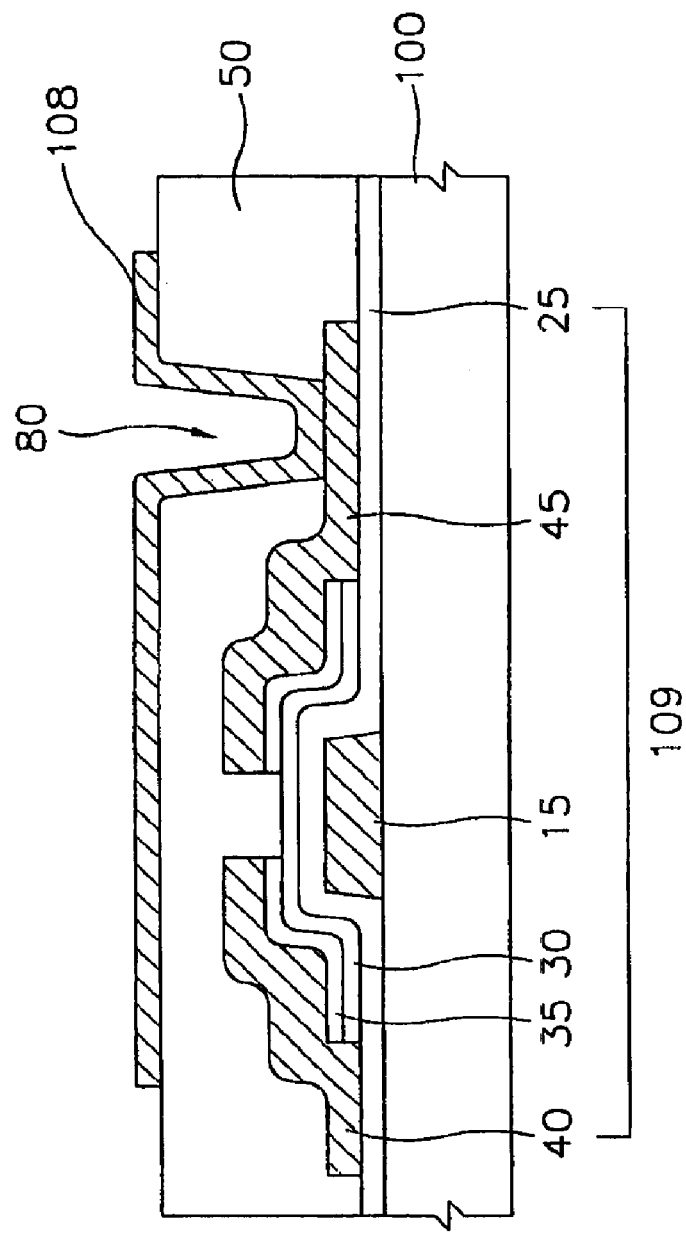
FIG. 3 is a cross-sectional view showing a thin film transistor and a pad region of a conventional LCD panel.
Figure 4:
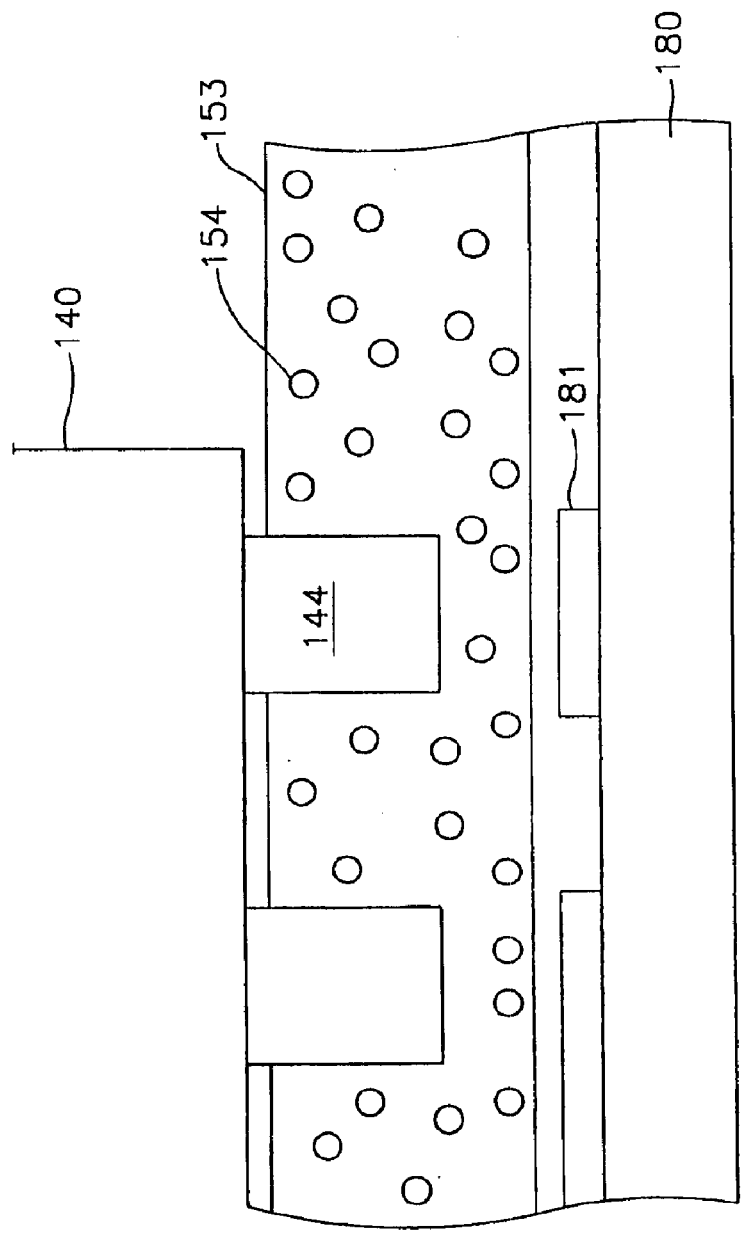
FIG. 4 is a cross-sectional view for explaining a conventional COG method for connecting an integrated circuit to a liquid crystal display device.
Figure 5:
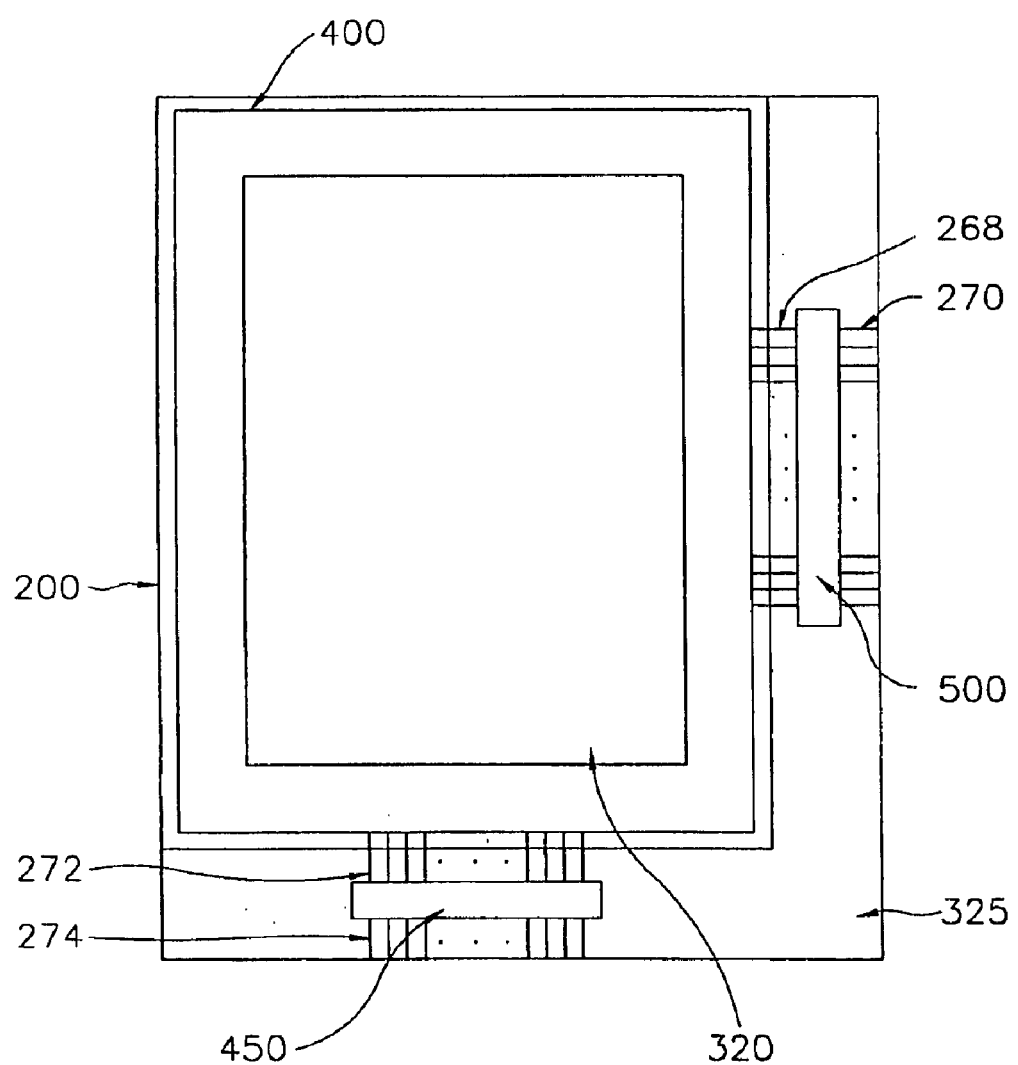
FIG. 5 is a schematic view showing an LCD panel of a liquid crystal display device according to the present invention.

FIG. 5 is a schematic view showing an LCD panel of a liquid crystal display device according to the present invention.

Referring to FIG. 5, an LCD panel of the present invention includes a first substrate 200, a second substrate 400 disposed opposite to the first substrate 200, and liquid crystal (not shown) injected between the first substrate 200 and the second substrate 400.

A plurality of gate lines and a plurality of data lines (not shown) are formed on the first substrate 200 in a matrix shape, and pixel electrodes and thin film transistors (not shown) are formed on the intersections of the gate and the data lines.

A color filter and a transparent common electrode (not shown) are formed on the second substrate 400. The color filter includes red·green·blue (RGB) pixels emitting predetermined color while light passes the RGB pixels. The first and the second substrates 200 and 400 are disposed opposite to each other and combined with each other after the liquid crystal is injected therebetween. Also, a polarization plate (not shown) may be attached on the respective surfaces of the first and the second substrates 200 and 400 for maintaining a transmitting direction of the external light according to an orientation of the liquid crystal.

An area of the second substrate 400 is smaller than that of the first substrate 200. A portion that the first and the second substrates 200 and 400 are overlapped becomes a display region 320, and other portion besides the overlapped portion becomes a non-display region 325.

In the non-display region 325, one or more terminals (i.e., output terminals) of a first COG integrated circuit (IC) 500 are connected to pads 268 (hereinafter, referred to as "first output pads") connected to the end portions of gate lines prolonged from the display region 320 to the non-display region 325 of the first substrate 200. The first COG IC 500 is a gate driver integrated circuit. The other terminals (i.e., input terminals) of the first COG IC 500 are connected to a flexible printed circuit (FPC) (not shown) through first signal lines. At this time, first input pads 270 are connected to end portions of the first signal lines.

In addition, one or more terminals (i.e., output terminals) of a second COG IC 450 are connected to pads 272 (hereinafter, referred to as "second output pads") connected to end portions of the data lines prolonged from the display region 320 to the non-display region 325 of the first substrate 200. The second COG IC 450 is a data driver integrated circuit. The other terminals (i.e., input terminals) of the second COG IC 450 are connected to the FPC through second signal lines. At that time, second input pads 274 are connected to end portions of the second signal lines.

The input pads 270 and 274 transmit signals generated from the FPC to the COG ICs 450 and 500, and the output pads 268 and 272 transmit operation signals generated from the COG ICs 450 and 500 to a pixel array formed on the display region 320.

For example, the output pads 268 and 272 connected to the end portions of the gate and data lines are arranged in a zigzag shape because the gap between the output pads is narrow due to a large number of output signals. Thus, the output terminals of the COG ICs 450 and 500 connected to the output pads 268 and 272 are also disposed in a zigzag shape. On the other hand, the input pads 270 and 274 connected to the end portions of signal lines are arranged in a line since the gap between the input pads is wider than that of the output pads 268 and 272 due to a small number of input signals. Hence, the input terminals of the COG ICs 450 and 500 connected to the input pads 270 and 274 are disposed in a line.

As for the output pads 268 and 272 connected to the output terminals of the driver integrated circuit, a potential difference between the adjacent pads is relatively small. On the other hand, a potential difference between the adjacent pads is relatively large in the input pads 270 and 274 connected to the input terminals of the driver integrated circuit. As a result, electrons in the pad to which a positive voltage is applied migrate into the pad to which a negative voltage is applied, so that the input pad with the positive voltage may be corroded. Therefore, in the present invention, for example, conductive barrier layers are formed on peripheral portions of the input pads 270 and 274 to prevent the wirings connected to the input pads 270 and 274 from being corroded when the integrated circuit is attached to the pads.

Embodiment 1

Figure 6:
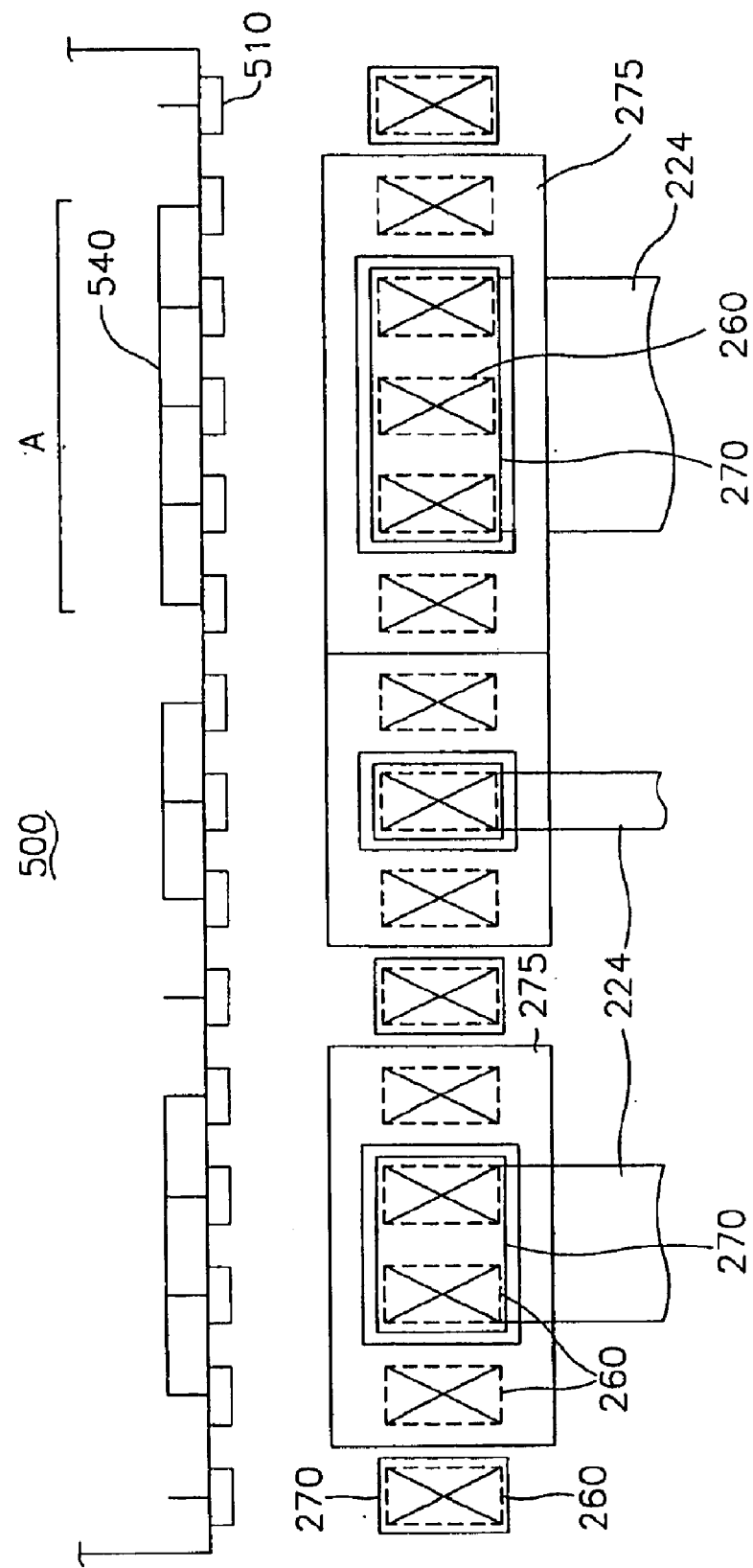
FIG. 6 is a schematic view showing a gate input pad part of a gate driver integrated circuit according to a first embodiment of the present invention.
Figure 7:
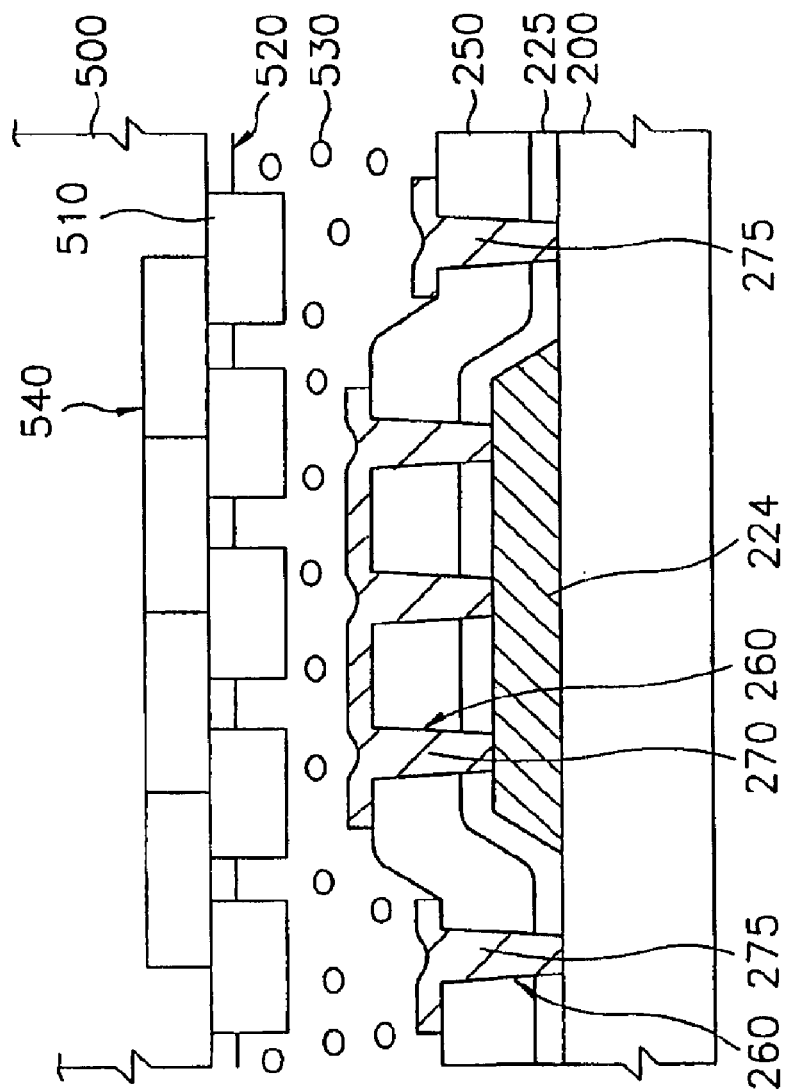
FIG. 7 is a cross-sectional view of part 'A' in FIG. 6.

FIG. 6 is a schematic view showing a gate input pad part of a gate driver integrated circuit according to a first embodiment of the present invention, and FIG. 7 is a cross-sectional view of part 'A' in FIG. 6.

Referring to FIGS. 6 and 7, a plurality of signal lines 224 are formed on a first substrate 200 on which thin film transistors and pixel electrodes are formed. Each of the signal lines 224 is covered with a gate insulation layer 225 and a passivation layer 250. A plurality of pad contact holes 260 corresponding to each of the signal lines 224 are formed through the passivation layer 250 and the gate insulation layer 225. A plurality of COG IC input pads 270 are formed on the passivation layer 250. The COG IC input pads 270 are connected to end portions of the corresponding signal lines 224 through the pad contact holes 260.

An anisotropic conductive films (ACF) resin 520 is coated on the input pads 270. The ACF resin 520 includes a plurality of conductive balls 530 therein.

When a plurality of bumps 510 of the COG IC 500 that is the gate driver integrated circuit are aligned and compressed on the corresponding input pads 270, the conductive balls 530 which are between the bumps 510 and the input pads 270 are compressed so that the COG IC 500 and the input pads 270 make contact with each other.

In the first embodiment of the present invention, conductive barrier layers 275 separated from the input pads 270 are formed on peripheral portions of the input pads 270 connected to the COG IC 500. The conductive barrier layers 275 have an electric potential equivalent to that of the input pads 270 by means of, for example, internal connections of the COG IC 500. The conductive barrier layers 275 and the input pads 270 are formed to constitute a same layer. For example, the conductive barrier layers 275 and the input pads 270 may be simultaneously formed in a same patterning process. Since the input pads 270 and the pixel electrodes are formed as a same layer, the conductive barrier layers 275 are formed of, for example, a transparent conductive film of indium-tin-oxide (ITO) or indium-zinc-oxide (IZO) in a transmission type liquid crystal display device. The conductive barrier layers 275 are also formed of a film of reflective metal such as aluminum (Al), aluminum alloy, silver and/or silver alloy in a reflection type liquid crystal display device.

For example, the conductive barrier layers 275 are formed in a closed loop shape as shown in FIG. 6. Thus, when the COG IC 500 and the input pads 270 are attached to each other, the conductive barrier layer 275 of the closed loop shape surrounding the vicinity of the input pads 270 has an electric potential equivalent to that of each of the input pads 270 by internal connections 540 of the COG IC 500. As a result, the corresponding input pads 270 are not exposed to pollutants due to the conductive barrier layers 275 having the equivalent electrical potential when the pollutants such as moisture or chemicals penetrate into the pad part making contact with the bumps 510 of COG IC 500. That is, the conductive barrier layers 275 prevent the input pads 270 and the signal lines 224 connected to the input pads 270 from being corroded.

FIGS. 8A to 8D are cross-sectional views for explaining a method for manufacturing a liquid crystal display device according to the first embodiment of the present invention. FIGS. 8A to 8D show a thin film transistor-liquid crystal display device having a bottom-gate structure.

Referring to FIG. 8A, a first metal layer is deposited on an insulating substrate 200 comprised of non-conductive material such as glass or ceramic and patterned via a photolithography process to form a gate wiring. The first metal layer includes, for example, a chrome (Cr) layer having a thickness of about 500 Å and an aluminum-neodymium (Al—Nd) layer having a thickness of about 2500 Å. The gate wiring includes a gate line prolonged in a first direction from a display region to a non-display region of the substrate 200, a gate electrode 215 branching off from the gate line and a gate terminal (not shown) located on an end portion of the gate line. At the same time, first signal lines 224 are formed on the non-display region of the substrate 200 in the first direction. The first signal lines 224 are connected to the input terminals of the first COG IC 500 (see FIG. 5) that is the gate driver integrated circuit. Preferably, the first signal lines 224 are comprised of the metal layer for forming the gate wiring. Also, it is preferred that second signal lines (not shown) connected to the input terminals of the second COG IC 450 (see FIG. 5) that is the date driver integrated circuit are manufactured from the metal layer for the gate wiring considering a wiring resistance.

Figure 8B:
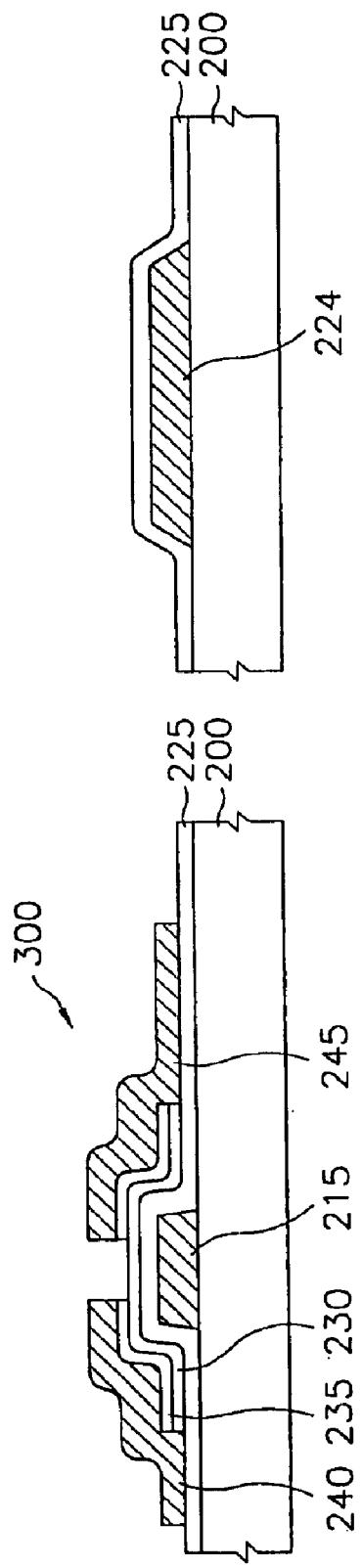

Referring to FIG. 8B, silicon nitride is deposited to a thickness of about 4500 Å via a plasma-enhanced chemical vapor deposition (PECVD) method on the entire surface of the substrate 200 on which the gate wiring and the first signal lines 224 are formed, thereby forming a gate insulating layer 225.

An active layer, e.g., an amorphous silicon layer, is deposited to a thickness of about 2000 Å via a PECVD method on the gate insulating layer 225. An ohmic contact layer, e.g., an $n^+$ doped amorphous silicon layer, is deposited to a thickness of about 500 Å via a PECVD method on the active layer. At this time, the amorphous silicon layer and the $n^+$ doped amorphous silicon layer are deposited in-situ in the same chamber of the PECVD equipment. Then, the ohmic contact layer and the active layer are patterned through a photolithography process to form an active pattern 230 consisting of the amorphous silicon layer and an ohmic contact layer pattern 235 consisting of the $n^+$ doped amorphous silicon layer on the gate insulating layer located above the gate electrode 215.

A second metal layer such as chrome (Cr), chrome-aluminum (Cr—Al), or chrome-aluminum-chrome (Cr—Al—Cr) is deposited to a thickness of about 1500 to about 4000 Å on the entire surface of the resultant structure via a sputtering method. Then, the second metal layer is patterned through a photolithography process to form a date wiring. The data wiring includes a data line prolonged in a second direction from the display region to the non-display region of the substrate 200, a source electrode 240 and a drain electrode 245 which branch off from the data line, and a drain terminal (not shown) located on an end portion of the data line. The second direction is perpendicular to the first direction. Hence, there is completed a thin film transistor 300 having the gate electrode 215, the active pattern 230, the ohmic contact layer pattern 235, the source electrode 240, and the drain electrode 245. At this time, the gate insulating layer 225 is interposed between the gate line and the date line to prevent the gate line from being in contact with the date line.

Successively, the ohmic contact layer pattern 235 exposed between the source electrode 240 and the drain electrode 245 is removed by a reactive ion etching (RIE). By doing so, an active pattern region exposed between the source and drain electrodes 240 and 245 is provided as a channel region of the thin film transistor 300.

In this embodiment, the active pattern 230 and the data wiring are formed using two masks. It should be noted that the method of forming the active pattern 230 and the data wiring is not limited to this embodiment. For example, a method of forming an active pattern, an ohmic contact layer pattern and data wiring using one mask is disclosed in U.S. Pat. No. 6,255,130 to Kim, issued on Jul. 3, 2001, the disclosure in its entirety is incorporated by reference herein, in which by employing one mask, the number of masks can be reduced to four in manufacturing a thin film transistor-liquid crystal display device having the bottom-gate structure. The method of manufacturing the thin film transistor-liquid crystal display device using four masks will be explained.

First, after successively depositing an amorphous silicon layer for the active layer and an n+ doped amorphous silicon layer for the ohmic contact layer on the gate insulating layer, a second metal layer for the data wiring is deposited thereon. Then, after coating a photoresist layer on the second metal layer, the photoresist layer is exposed and developed to form a photoresist pattern (not shown) including a first portion having a first thickness and located on the channel part of the thin film transistor, a second portion having a second thickness thicker than the first thickness and located on the data wiring part, and a third portion in which the photoresist layer is removed completely. Thereafter, the second metal layer, the ohmic contact layer and the active layer located under the third portion, the second metal layer under the first portion and a partial thickness of the second portion are etched away. As a result, the data wiring consisting of the second metal layer, the ohmic contact layer pattern 235 of the n+ doped amorphous silicon layer and the active pattern 230 of the amorphous silicon layer are formed simultaneously. Then, the remaining photoresist pattern is removed so that the active pattern 230, the ohmic contact layer pattern 235 and the data wiring including the source/drain electrodes 240 and 245 are formed at the same time using one mask.

Figure 8C:
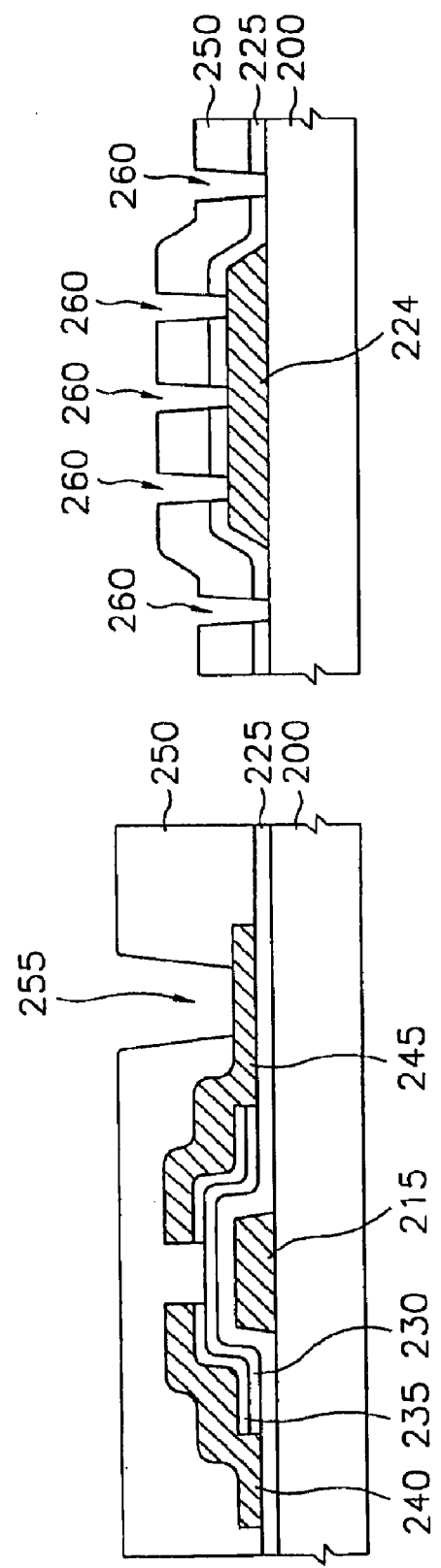

Referring to FIG. 8C, a passivation layer 250 for insulating the data wiring from pixel electrodes that will be formed thereon is formed on the entire surface of the substrate 200 on which the thin film transistor 300 is formed. The passivation layer 250 is made of, for example, inorganic material such as silicon nitride or photosensitive organic material such as acrylic resin. In case of the reflection type or the reflection-transmission type liquid crystal display device, the passivation layer 250 is formed of the photosensitive organic material and a plurality of grooves are formed on the surface thereof in order to improve the reflectivity of the liquid crystal display device.

After a contact hole 255 exposing the drain electrode 245 is formed through the passivation layer 250 by a photolithography or an exposure/development process, the gate insulating layer 225 of the pad region is dry-etched away to form pad contact holes 260 which expose the end portions of the gate terminal, the data terminals and the signal lines.

Figure 8D:
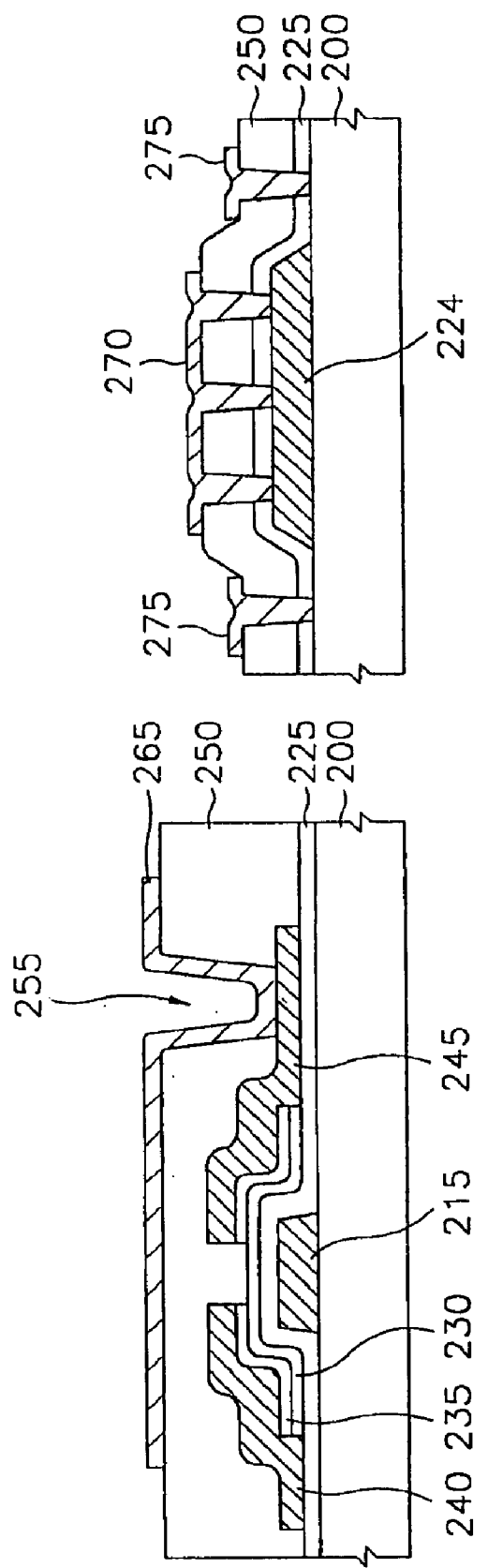

Referring to FIG. 8D, a transparent conductive layer such as ITO or IZO or a reflective metal layer such as Al, Al alloy, Ag or Ag alloy is deposited on the entire surface of the resultant structure and patterned via a photolithography process, thereby forming a pixel electrode 265 connected to the drain electrode 245 of the thin film transistor through the contact hole. At the same time, a plurality of first pads and second pads are formed on the pad contact holes.

The first pads include first output pads 268 (see FIG. 5) connected to gate terminals and to the output terminals of the gate driver integrated circuit (the first COG IC 500), and first input pads 270 connected to the end portions of the respective first signal lines and to the input terminals of the first COG IC 500.

The second pads include second output pads 272 (see FIG. 5) connected to data terminals and to the output terminals of the data driver integrated circuit (the second COG IC 450), and second input pads 274 (see FIG. 5) connected to the end portions of the respective second signal lines and to the input terminals of the second COG IC 450.

According to the present embodiment, when the pixel electrode 265 and the pads are formed, first conductive barrier layers 275 having electric potential equivalent to that of the first input pads are formed on the peripheral portions of the first input pads 270 connected to the first COG IC which is the gate driver integrated circuit, and second conductive barrier layers (not shown) having electric potential equivalent to that of the second input pads are formed on the peripheral portions of the second input pads 274 connected to the data driver integrated circuit. Preferably, the first and second conductive barrier layers are formed in a closed loop shape.

After forming a first orientation layer (not shown) on the entire surface of the resultant structure on which the pixel electrode 265, the pads 270 and the conductive barrier layers 275 are formed, and a second substrate (not shown) is disposed opposite to the first substrate 200. The second substrate includes a color filter, a common electrode, a second orientation layer, a phase retardation plate, and a polarization plate.

After a plurality of spacers (not shown) are interposed between the first substrate 200 and the second substrate, liquid crystal (not shown) is injected into the space between the first substrate 200 and the second substrate, thereby completing the reflection type, the transmission type or the reflection-transmission type liquid crystal display device.

Then, after the ACF resin including conductive balls is disposed on the pads of the first substrate 200, bumps of the gate and data driver integrated circuits are pressed toward the pads by a COG method, thereby completing a liquid crystal display device module.

Embodiment 2

FIG. 9 is a schematic view showing a gate input pad part of a gate driver integrated circuit according to a second embodiment of the present invention.

Referring to FIG. 9, conductive barrier layers 276 having electric potential equivalent to that of each of the input pads 270 are formed in an opened loop shape to prevent leakage current from being generated between the signal lines 224 connected to the input pads 270 and the conductive barrier layers 276. Thus, even though pollutants such as moisture or chemicals are penetrated into the pad part making contact with the bumps of the gate driver integrated circuit, the corrosion of the input pads 270 and the signal lines 224 connected to the input pads 270 is prevented due to the conductive barrier layers 276.

Embodiment 3

Figure 10:
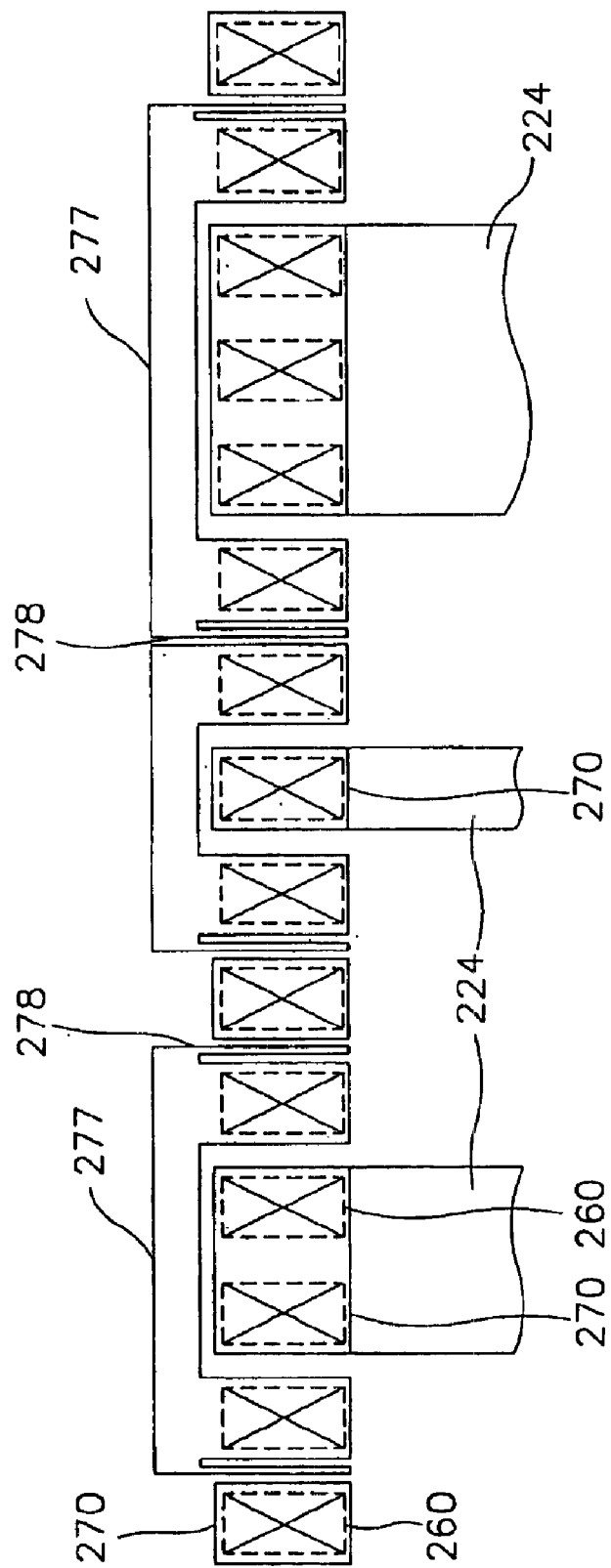
FIG. 10 is a schematic view showing a gate input pad part of a gate driver integrated circuit according to a third embodiment of the present invention.

FIG. 10 is a schematic view showing a gate input pad part of a gate driver integrated circuit according to a third embodiment of the present invention.

Referring to FIG. 10, conductive buffer layers 278 are formed on both sides of each of the signal lines 224 connected to the input pads 270. The conductive buffer layers 278 protrude from conductive barrier layers 277 having electric potential equivalent to that of each of the pads 270. Accordingly, even though pollutants penetrate into the conductive barrier layers 277 making contact with the bumps of the gate driver integrated circuit, the corrosion of the conductive barrier layers 277 is prevented due to the conductive buffer layers 278 having the equivalent electric potential.

Embodiment 4

Figure 11:
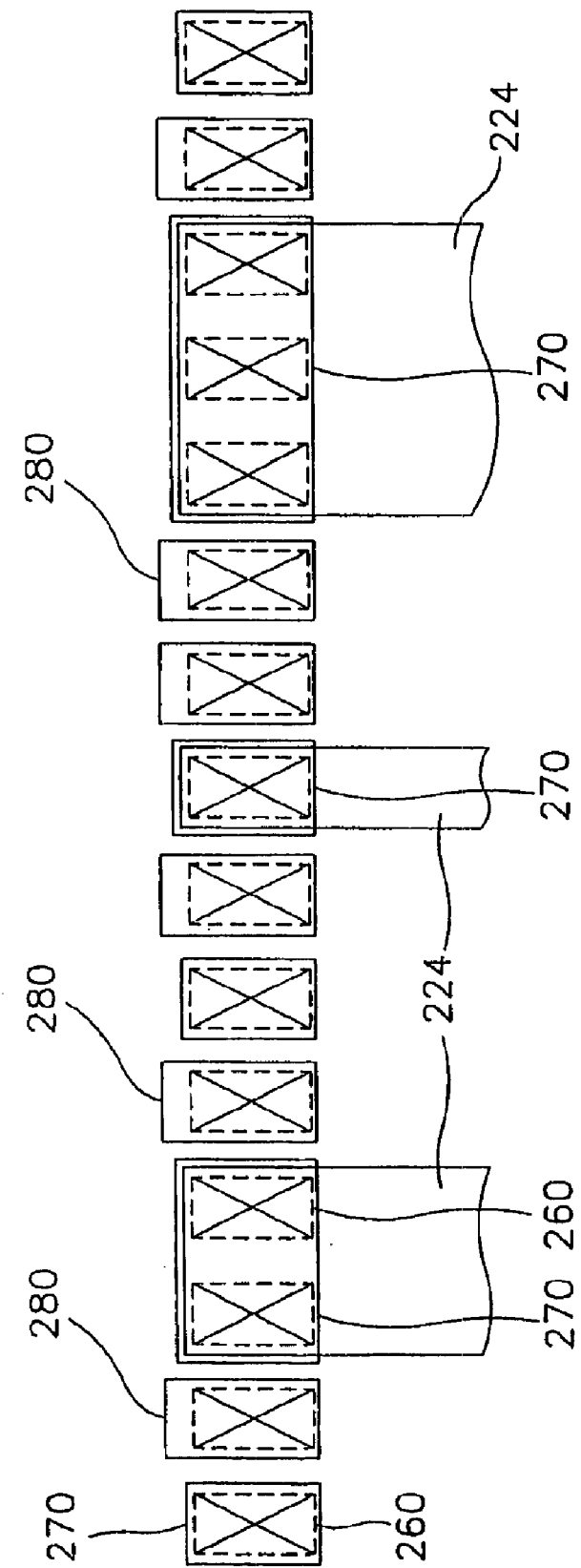
FIG. 11 is a schematic view showing a gate input pad part of a gate driver integrated circuit according to a fourth embodiment of the present invention.

FIG. 11 is a schematic view showing a gate input pad part of a gate driver integrated circuit according to a fourth embodiment of the present invention.

Referring to FIG. 11, conductive barrier layers 280 separated from the signal lines 224 are formed on both sides of each of the signal lines 224 connected to the input pads 270. In this case, each of the input pads 270 and the peripheral conductive barrier layers 280 have equivalent electric potential by internal connections of the gate driver integrated circuit. Thus, the conductive barrier layers 280 efficiently prevent the input pads 270 and the signal lines 224 connected to the input pads 270 from being corroded.

Embodiment 5

Figure 12:
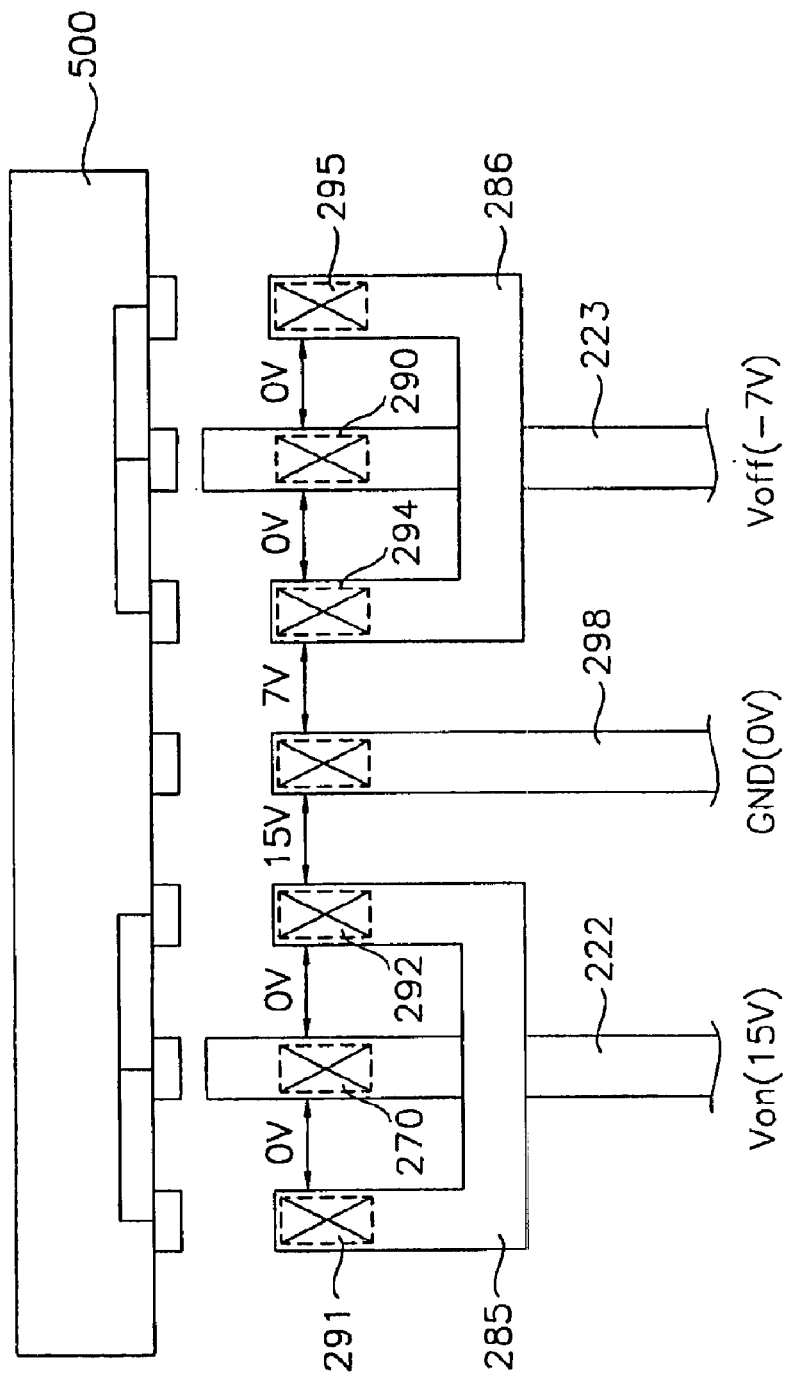
FIG. 12 is a schematic view showing a gate input pad part of a gate driver integrated circuit according to a fifth embodiment of the present invention.

FIG. 12 is a schematic view showing a gate input pad part of a gate driver integrated circuit according to a fifth embodiment of the present invention.

Referring to FIG. 12, conductive barrier layers 285 and 286 having equivalent electric potential are formed on the peripheral portions of each of the input pads 270 and 290 connected to the COG IC 500, so that the potential difference between the input pads 270 and 290 connected to the signal lines 222 and 223 and the input pads 291, 292, 294 and 295 located on both sides of each of the input pads 270, 290 connected with the signal lines 222 and 223 becomes zero. Then, a signal line for reducing the potential difference, preferably a ground line (GND) 298, is inserted between the input pads 270 and 290 connected to the COG IC 500.

Particularly, the input pads 291 and 292, which are located on the sides of the input pad 270 connected to the signal line 222 to which voltage Von is applied, are connected to each other via the conductive barrier layer 285 of equivalent electric potential. By doing so, the potential difference between the input pad 270 connected to the signal line 222 of voltage Von and the input pads 291 and 292 located on the sides of the input pad 270 becomes zero. In the same manner as above, the input pads 294 and 295, which are located on the sides of the input pad 290 connected to the signal line 223 to which voltage Voff is applied, are connected to each other via the conductive barrier layer 286 of equivalent electric potential, so that the potential difference between the input pad 290 connected to the signal line 223 of voltage Voff and the input pads 294 and 295 located on the sides of the input pad 290 becomes zero. Then, the ground line 298 is inserted between the input pad 270 of voltage Von and the input pad 290 of voltage Voff.

When the voltage Von is even higher than 15V, corrosion of the input pad 270 connected to the COG IC 500 is prevented because the potential difference between the input pad 270 connected to the COG IC 500 and the adjacent input pads 291 and 292 is zero. Further, when voltage Von is +15V and voltage Voff is −7V, the potential difference of 22V between the Von input pad 270 and the Voff input pad 290 is divided into 15V and 7V. Thus, corrosion of the input pads 291, 292, 294 and 295 located on the sides of the respective input pads 270 and 290 connected to the COG IC 500 is efficiently prevented.

In case that the signal voltage applied to the input pads 270 and 290 connected to the COG IC 500 is increased, a plurality of ground lines may be inserted between the input pads 270 and 290 connected to the COG IC 500 to prevent corrosion of the input pads 291, 292, 294, 295.

According to the fifth embodiment of the present invention as described above, at least one ground line is inserted between the pads connected to the integrated circuit, thereby preventing the pad having an electric potential equivalent to that of the pads connected to the integrated circuit from being corroded.

In the above-described embodiments of the present invention, the conductive barrier layers are formed on the gate input pad part connected to the input terminals of the gate driver integrated circuit. In like manner, the conductive barrier layers each having equivalent electric potential can be formed on the data input pad part connected to the input terminals of the data driver integrated circuit according to the same methods as the above-mentioned embodiments. Also, the driver integrated circuits can be installed by any other installing method as well as the COG method.

According to the present invention, the conductive barrier layers having equivalent electric potential are separated from each of the pads and formed on the peripheral portions of each of the pads connected to the integrated circuit, thereby preventing the pads and the wirings connected to the pads from being corroded due to pollutants when the bumps of the integrated circuits and the pads are attached to each other.

Although the exemplary embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method of manufacturing a display device comprising the steps of:

forming wirings on a substrate;

forming a passivation layer on the wirings and the substrate;

partially etching the passivation layer to open contact regions on the wirings;

depositing a conductive layer on the resultant structure and patterning the conductive layer to form a plurality of pads each connected to corresponding one of the wirings through corresponding one of the contact regions; and forming conductive barrier layers to be separated from the pads and formed on peripheral portions of the pads, the conductive barrier layers having electric potential equivalent to electric potential applied to the pads.

2. The method of manufacturing a display device as claimed in claim 1, wherein the pads and the conductive barrier layers are simultaneously formed in a same layer.

3. The method of manufacturing a display device as claimed in claim 2, wherein the conductive layer includes indium-tin-oxide (ITO) or indium-zinc-oxide (IZO).

4. The method of manufacturing a display device as claimed in claim 1, wherein the conductive layer includes reflective metal selected from the group consisting of aluminum, aluminum alloy, silver and sliver alloy.

5. The method of manufacturing a display device as claimed in claim 1, wherein the conductive barrier layers are formed in a closed loop shape.

6. The method of manufacturing a display device as claimed in claim 1, wherein conductive barrier layers are formed in an opened loop shape.

7. The method of manufacturing a display device as claimed in claim 1, wherein conductive buffer layers protruded from the conductive barrier layers are simultaneously formed on sides of the wirings connected to the pads during the step of patterning the conductive layer.

8. The method of manufacturing a display device as claimed in claim 1, wherein the conductive barrier layers are formed on sides of each of the wirings connected to the pads.

9. The method of manufacturing a display device as claimed in claim 8, wherein the conductive barrier layers are connected to an external integrated circuit.

10. The method of manufacturing a display device as claimed in claim 1, wherein the pads are connected to an external integrated circuit.

11. The method of manufacturing a display device as claimed in claim 10, wherein at least one DC voltage line is simultaneously formed between the pads in the step of patterning the conductive layer.

12. The method of manufacturing a display device as claimed in claim 1, wherein an external integrated circuit is formed in contact with the pads by a chip on glass.

* * * * *